US007108376B2

United States Patent
Yamamoto

(10) Patent No.: US 7,108,376 B2
(45) Date of Patent: Sep. 19, 2006

(54) COMPACT PROJECTION DISPLAY DEVICE

(75) Inventor: Chikara Yamamoto, Kodaira (JP)

(73) Assignee: Fujinon Corporation, Saitama (JP)

( * ) Notice: Subject to any disclaimer, the term of this patent is extended or adjusted under 35 U.S.C. 154(b) by 176 days.

(21) Appl. No.: 10/988,603

(22) Filed: Nov. 16, 2004

(65) Prior Publication Data

US 2005/0105056 A1    May 19, 2005

(30) Foreign Application Priority Data

Nov. 17, 2003   (JP)  ............................ 2003-386199

(51) Int. Cl.
*G03B 21/26* (2006.01)
(52) U.S. Cl. ...................................... 353/30
(58) Field of Classification Search ................ 353/30, 353/31, 33, 34
See application file for complete search history.

(56) References Cited

FOREIGN PATENT DOCUMENTS

| JP | H07-333497 | 12/1995 |
|---|---|---|
| JP | 2002-258154 | 9/2002 |

*Primary Examiner*—Melissa Jan Koval
*Assistant Examiner*—Andrew Kong
(74) *Attorney, Agent, or Firm*—Arnold International; Jon W. Henry; Bruce Y. Arnold

(57) ABSTRACT

A projection display device includes a plurality of display elements, such as transmissive-type or reflective-type liquid crystal light valves. Each display element includes an effective pixel region and an image display region that is smaller than and within the effective pixel region. Different light beams are modulated by the display elements and the light beams are combined by an optical block combiner to form a projected image. The central position of the image display region of at least one of the display elements is offset from the central position of the effective pixel region so that the distance between central positions of the image display regions of at least two of the display elements, including at least one display element with an offset image display region, is less than a standard distance associated with prior art arrangements of projection display devices. This enables making the optical block combiner smaller.

24 Claims, 5 Drawing Sheets

10

10A  10B  10C

Light Valve Outer Perimeter

Effective Pixel Region

Image Display Region

COMPACT PROJECTION DISPLAY DEVICE

FIELD OF THE INVENTION

The present invention relates to projection display devices that modulate multiple light beams with image information, combine the modulated light beams and project the combined modulated light beams in order to form a magnified image. The present invention further relates to enabling miniaturization of the projection display devices by enabling the optical elements that operate to combine the modulated light beams to be made smaller.

BACKGROUND OF THE INVENTION

In recent years, the projector market has been growing rapidly, along with the use of personal computers. Liquid crystal display elements of the transmission-type and the reflection-type and DMD display elements that include micro mirrors in an orderly array are known display elements that modulate light in order to produce image light signals. Projection display devices using such display elements include front projection devices that project personal computer images and rear projection devices that project television images.

In such projection display devices, the projected images may have various common aspect ratios. For example, aspect ratios of 4:3 or 16:9 are popular for television images, and accordingly, display elements are generally manufactured with effective pixel regions having one of these two aspect ratios.

When an aspect ratio is required that is different from the two common ones described above, it is known to change the aspect ratio of the light beam modulated by the display element by, for example, using an anamorphic lens in the projection optical system as described in Japanese Laid-Open Patent Applications H07-333497 and 2002-258154. However, the use of an anamorphic lens tends to enlarge the optical system. Moreover, the use of such a lens also tends to increase the production costs and to decrease the optical performance when projecting an image.

When a projected image having an aspect ratio other than the two common ones described above is required, it is not practical in terms of manufacturing costs to manufacture display elements with appropriate aspect ratios that meet the demands of individual requests relating to the size and the number of pixels. Therefore, a low-cost, compact projection display device that allows for the use of generally available display elements, as described above, with their usual aspect ratios is demanded.

BRIEF SUMMARY OF THE INVENTION

The present invention relates to a low-cost, compact projection display device that uses generally available display elements with a conventional aspect ratio but projects a magnified image having a different aspect ratio and/or a different number of pixels in the projected image than that associated with the effective pixel region of the light valves.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Projection display devices of the present invention will now be described with reference to FIGS. 1–7. Projection display devices of the present invention include a plurality of display elements that display two-dimensional image information and which have about the same form. The projection display devices divide light from a single light source into a plurality of light beams, each of which: (1) irradiates a corresponding display element in order to modulate the light beams with image information, (2) combines the modulated light beams using an optical block that operates as a beam combiner, and (3) directs the combined modulated light beams so as to create a magnified projected image.

Figure 1:
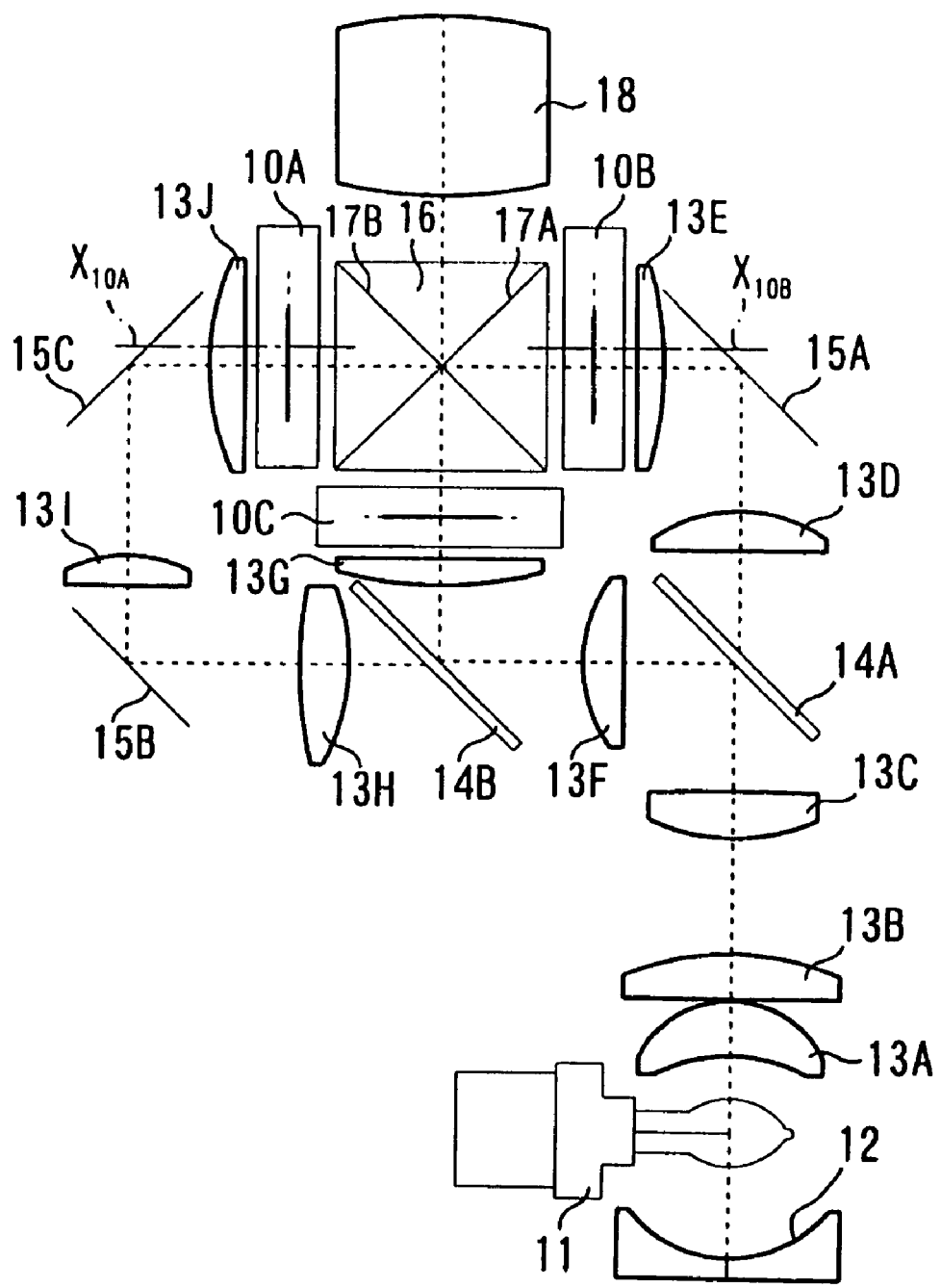
FIG. 1 is a cross-sectional schematic diagram of a projection display device of Embodiment 1 of the present invention.

First, as an example, some basic features of the present invention will be described with reference to FIG. 1. FIG. 1 is a cross-sectional schematic diagram of a projection display device of Embodiment 1 of the present invention.

In Embodiment 1, transparent-type liquid crystal light valves 10A–10C are used as display elements that modulate incident light beams with image information for magnification and projection in order to provide a projected image. The illumination optical system that illuminates the display elements includes a light source 11, a reflector 12 that is a spherical mirror, lenses 13A–13J that act similarly to a single lens or as relay lenses, color dividers 14A and 14B that are dichroic mirrors, and total reflection mirrors 15A–15C. The light source 11 is arranged so that its emission point is positioned at or near the spherical center of the reflector 12, thus providing an inexpensive light source. Also, a projection optical system that projects a magnified image with the image information being displayed on the display elements includes a color combiner 16 and a projection lens 18. The color combiner 16 may be of the optical-block-type that includes an X-shaped dichroic structure in the light path. Such a color combiner may be formed, for example, using joined prisms that include internal dichroic films that intersect one another where optical axes intersect.

As shown in FIG. 1, the color divider 14A divides light that is directed toward the display element 10B from other light, and the color divider 14B divides from this other light, light that is directed toward the liquid crystal light valve 10A and light that is directed toward the liquid crystal light valve 10C. Additionally, dichroic films inside the color combiner 16 include a dichroic film 17A that reflects light transmitted by the liquid crystal light valve 10A and transmits light transmitted by the liquid crystal light valves 10B and 10C, and also include a dichroic film 17B that reflects light transmitted by the liquid crystal light valves 10B and transmits light transmitted by the liquid crystal light valves 10A and 10C. The three light beams that are incident onto the liquid crystal light valves 10A–10C correspond to the three primary colors of blue, red, and green in any order.

In the projection display device of the present invention, the image display region where image information is displayed by each display element is made smaller than the effective pixel region where an image can be displayed by each display element, and for at least one display element, the central position of the image display region is established to be offset from the central position of the effective pixel region.

Figure 2:
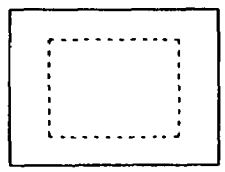
FIG. 2 is a cross-sectional schematic diagram of three light valves of the projection display device of FIG. 1, their effective pixel regions, and their image display regions.
Figure 2:
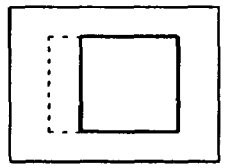
Figure 2:
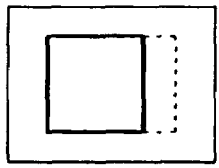
Figure 2:
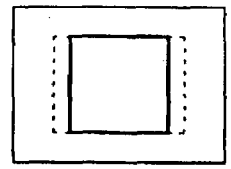
Figure 2:
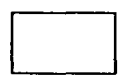
Figure 2:
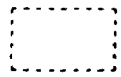
Figure 2:
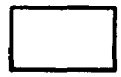

In order to provide an explanation using Embodiment 1 as an example, a view of the transparent-type liquid crystal light valves 10A–10C as seen from the illumination optical system side is shown in FIG. 2. Although the liquid crystal light valves 10A–10C all have the same size effective pixel region and the same outer perimeter as shown in FIG. 2, because the image display region is made smaller than, and within, the effective pixel region there exist regions on the liquid crystal light valves 10A–10C where image display is possible but image information is not displayed. Additionally, as shown in FIG. 2, the outer perimeter of each liquid crystal light valve includes the substrate, and the positions of the image display regions on the liquid crystal light valves 10A–10C are set so as to be different from one another. In the liquid crystal light valves 10A and 10B, the central position of each image display region is established so as to be offset from the central position of each effective pixel region, with the image display region being shifted to the right side of the page for the liquid crystal light valve 10A and the image display region being shifted to the left side of the page for the liquid crystal light valve 10B. In the liquid crystal light valve 10C, the central position of the image display region and the central position of the effective pixel region are established to coincide with each other.

In the projection display device of the present invention, such an offset between the central position of the image display region and the central position of the effective pixel region is established so that the distance between central positions of image display regions of the display elements, as measured along the optical axes (indicated by broken straight lines in FIGS. 1–7) is smaller than the distance between central positions of image display regions when an optical-block-type color combiner is installed having a surface of about the same width as the width of each effective pixel region and with the central position of each image display region being established so as to be coincident, or nearly coincident, with the central position of each effective pixel region. The distance between the central positions of adjacent image display elements is defined herein as a "standard distance." The standard distance is well-defined by the particular size of the display elements and the conventional arrangement of display elements around an optical-block-type color combiner. This may be understood by comparing FIG. 3, which illustrates the light valve element periphery, the available pixel area within the light valve element periphery, as well as the projected indicator area. As shown, in FIG. 3, the size of the projected indicator areas for the transparent-type liquid crystal light valves 10A–10C is smaller than the size of the available pixel area. In a prior art projection display device as shown in FIG. 7, the projected indicator area comprises the entire available pixel area. The arrangement shown in FIG. 3, that uses a smaller projected indicator area than the available pixel area, is referred to hereinafter as "the display element installment condition of the present invention" in contrast to the situation shown in prior art FIG. 7 wherein all of the available pixel area is used and thus the size of the projected indicator area matches the size of the available pixel area. Thus, the arrangement of FIG. 3 enables the optical-block-type color combiner to be made smaller than when the central position of the image display region and the central position of the effective pixel region of each of the display elements are made to coincide as shown in FIG. 7.

Figure 3:
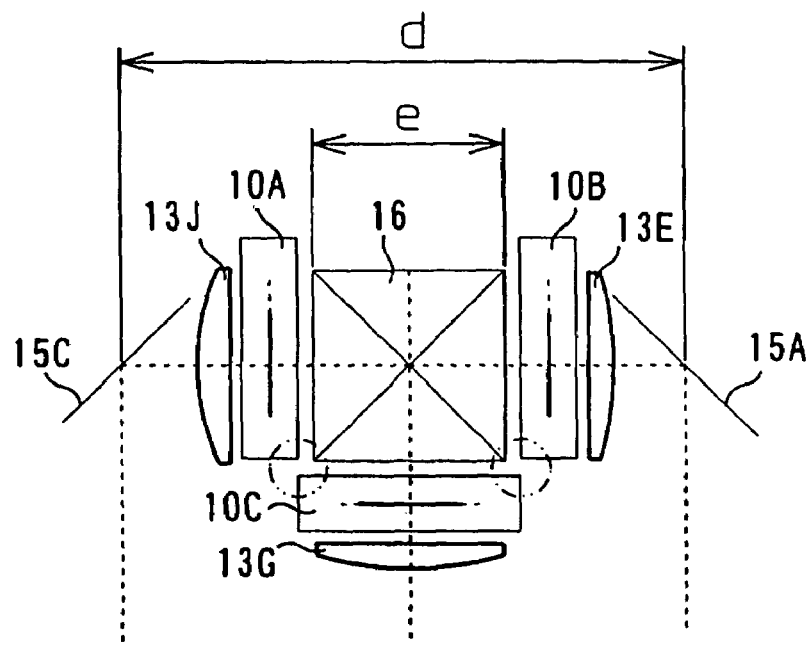
FIG. 3 is a portion of FIG. 1.

FIG. 7 shows a construction in which an optical block that operates as a color combiner is installed with a surface having about the same width as the width of each effective pixel region and with the central position of each image display region being established so as to be coincident, or nearly coincident, with the central position of each effective pixel region. In FIG. 7, the last two digits and the alphabet letters of the reference numerals are the same as the reference numerals of the corresponding elements of Embodiment 1 as shown in FIG. 3. Because the operation of the display elements in FIG. 7 is the same as the operation of their corresponding display elements in FIG. 3, a further explanation of their operation is omitted.

Referring to FIG. 7, an optical-block-type color combiner 1116 is shown that includes an X-shaped dichroic structure in the light path. The optical-block-type color combiner 116 is installed with a surface having about the same width as the width of the effective pixel regions of the transparent-type liquid crystal light valves 110A–110C. Additionally, as shown in FIG. 7, all three of the liquid crystal light valves 110A–110C have the central positions of their image display regions established so as to be coincident, or nearly coincident, with the central position of each effective pixel region. As is clear from comparing FIGS. 3 and 7, the optical-block-type color combiners 16 and 116 have different dimensions e and E, respectively, while the transparent-type liquid crystal light valves 10A–10C and 110A–110C are all the same size.

In the projection display device of FIG. 3, the central positions of the image display regions of the liquid crystal light valves 10A and 10B are offset from the central positions of the effective pixel regions so that the distance between central positions of the image display regions of the liquid crystal light valves 10A–10C, as measured along optical axes (indicated by broken straight lines in FIGS. 3 and 7) is smaller than the 'standard distance' between the central positions of the image display regions of the liquid crystal light valves 110A and 110B in FIG. 7. In the projection display device of the present invention, by placing specified display elements so that the central positions of the image display regions and the central positions of the effective pixel regions are offset, based on the display element installment condition of the present invention, the size of the optical-block-type color combiner can be reduced, and the overall size of the projection display device can be similarly reduced (i.e., due to the reduced size of the optical-block-type color combiner).

Although it is possible to reduce the size of the optical-block-type color combiner 116 of FIG. 7 in accordance with size reductions of the image display regions, a specified space is necessary between display elements in the nearest-neighbor regions of the display elements (indicated with double dot-broken line circles in FIG. 3 and FIG. 7), and the arrangement of FIG. 7 cannot increase the miniaturization of the device beyond the extent of size reduction of the optical-block-type color combiner 16 shown in FIG. 3.

However, in the projection display device of the present invention, because the central positions of the image display regions and the central positions of the effective pixel regions are offset, even if the distance between the light valves in the closest neighboring regions of the light valves are about the same as in FIG. 7, the distance between light valves 10A and 10B can be reduced by the amount by which the optical-block-type color combiner is reduced from E to e. As a result, the device of the present invention can be constructed so that the distance d between the mirror 15A and mirror 15C, as shown in FIG. 3, is less than the distance D between the mirror 115A and mirror 115C, as shown in FIG. 7.

In the projection display device of the present invention, if a light beam transmitted by the entire effective pixel region of a display element is projected, images from at least two display elements are projected so as to be offset from each other on a screen. On the other hand, in the prior art example, even when a light beam transmitted by the entire effective pixel region of a display element is projected, images from all the display elements are projected so as to coincide with one another on a screen. From this fact also it is clear that the projection display device of the present invention is one that achieves miniaturization when the image display region is smaller than the effective pixel region by using the image display region more effectively.

In the projection display device of the present invention, such miniaturization of the optical-block-type color combiner can be achieved, especially when the image display region is made smaller than the effective pixel region in the width direction of the opposing prism surface for each display element because the width of the optical-block-type color combiner can be reduced.

Note that, although chromatic aberration and distortion of projected images are sometimes considered for projection display devices where the central position of each image display region and the central position of each effective pixel region do not always exactly coincide with each other, this is different from the arrangements of the present invention referred to above.

Additionally, although precisely speaking, display element arrangements are known where the image display region is at the center and a region where the image information is not displayed is a peripheral area of the effective pixel region, the region where the image is not displayed is established as a margin having a constant distance to the periphery, but this is also different from the present invention.

In the projection display device of Embodiment 1, the image display region of each of the transparent-type liquid crystal light valves 10A–10C has a square shape, and the effective pixel regions of each of the transparent-type liquid crystal light valves 10A–10C have an aspect ratio of 4:3. Although the projection display device of the present invention may be used with the aspect ratio of the effective pixel regions and the aspect ratio of the image display regions being the same, and with the image display regions being smaller than the effective pixel regions, the present invention is especially advantageous when the aspect ratio of the effective pixel regions and the aspect ratio of the image display regions are different for different ones of the plurality of display elements.

Also, in the projection display device of Embodiment 1, the positions where the optical axes of the illumination optical systems which illuminate the transparent-type liquid crystal light valves 10A and 10B, and the positions where the optical axes of the of the projection optical system to which light beams from the transparent-type liquid crystal light valves 10A and 10B (shown in FIG. 1 by dotted lines) intersect the transparent-type liquid crystal light valves 10A and 10B are displaced vertically from the central positions of the transparent-type liquid light valves 10A and 10B (through which the broken lines $X_{10A}$ and $X_{10B}$, shown in FIG. 1 parallel to the optical axes, pass).

Figure 4:
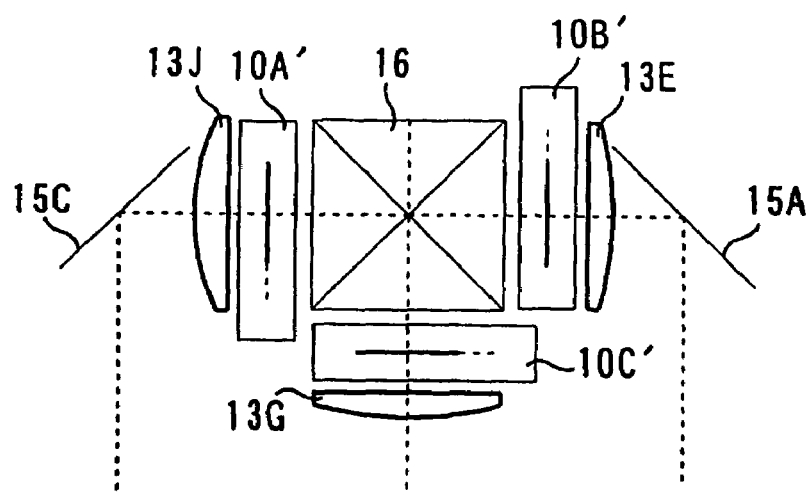
FIG. 4 is a partial cross-sectional schematic diagram of a projection display device of Embodiment 2 of the present invention.

FIG. 4 is a cross-sectional schematic diagram of a projection display device of Embodiment 2 of the present invention. Embodiment 2 is a modification of Embodiment 1, with the positions of the image display regions of the transparent-type liquid crystal light valves 10A'–10C' and the positions where the liquid crystal light valves 10A'–10C' are installed are different from those of Embodiment 1. The transparent-type liquid crystal display elements 10A'–10C', like Embodiment 1, have an aspect ratio of 4:3 and the image display regions have a square shape and are positioned so that they look the same as display element 10B of Embodiment 1 when viewed from the illumination optical system side.

In Embodiment 2, as in Embodiment 1, the image display regions of the liquid crystal light valves 10A'–10C' are smaller than the effective pixel regions, and the central position of the image display regions of each of the liquid crystal light valves 10A'–10C' is offset from the central position of the effective pixel region by satisfying the display element installation condition of the present invention. Therefore, as in Embodiment 1, the size of the optical-block-type color combiner 16 can be reduced, and along with this size reduction, the projection display device display as a whole can be made accordingly smaller.

Figure 5:
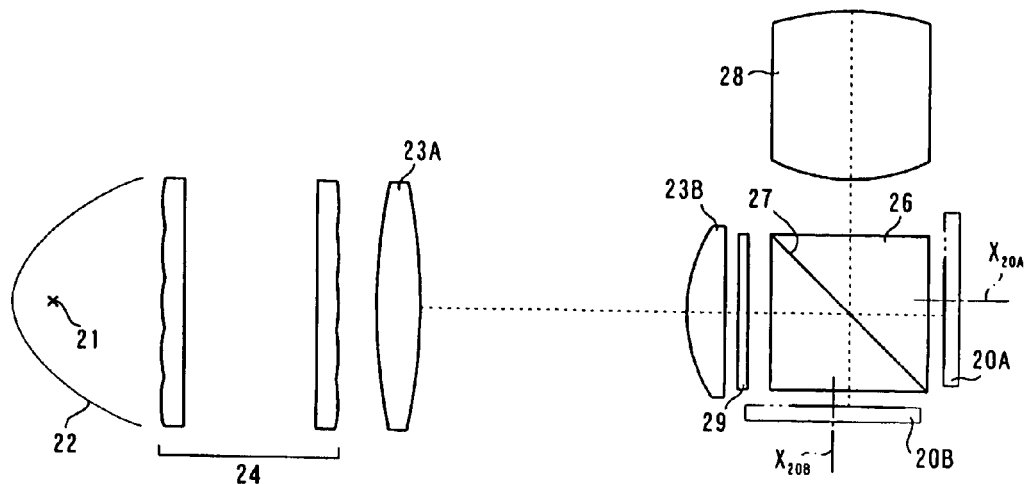
FIG. 5 is a cross-sectional schematic diagram of a projection display device of Embodiment 3 of the present invention.

FIG. 5 is a cross-sectional schematic diagram of a projection display device of Embodiment 3 of the present invention. In Embodiment 3, reflection-type liquid crystal light valves 20A and 20B are used as display elements.

As shown in FIG. 5, the illumination optical system that illuminates the reflection-type liquid crystal light valves 20A and 20B includes a light source 21, a reflector 22 made as a parabolic mirror, an integrator system 24, lenses 23A and 23B that operate similarly to a single lens, a wavelength-specific polarization changing element 29, and a polarization sensitive beam splitter/combiner 26 formed as an optical block for separating/combining light beams based on their state of polarization. The light source 21 is arranged so that its emission point is positioned at or near the center of the parabolic reflector 22. The integrator system 24 achieves homogenization of the light intensity distribution in the plane perpendicular to the optical axis so that a light flux from the light source 21 is efficiently irradiated onto the effective openings of the reflection-type liquid crystal light valves 20A and 20B. Also, a projection optical system that projects a magnified image of the image information displayed on the reflection-type liquid crystal light valves 20A and 20B includes the polarization sensitive beam splitter/combiner 26 and a projection lens 28.

As shown in FIG. 5, the polarization sensitive beam splitter divides the light beam incident from the light source 21 into a light beam of one wavelength range that is transmitted to display element 20A and a light beam of another wavelength range that is reflected to reflection-type liquid crystal light valves 20A and 20B. Then, light that is reflected from the liquid crystal light valves 20A and 20B containing image information is transmitted by the polarization sensitive beam splitter/combiner 26 to the projection lens 28. The wavelength-specific polarization changing element 29 is installed on the light source side of the polarization sensitive beam splitter/combiner 26 and rotates the direction of linear polarization of a light beam of a specified wavelength by a specified angle. Among the illumination light fluxes incident with a uniform polarization direction, only the light flux near the specified wavelength is changed in its polarization direction by the wavelength-specific polarization changing element 29. Thus, the illumination light flux is divided at a polarization sensitive separation film 27 between a reflected beam that is directed toward the display element 20B and a transmitted beam that is directed toward the display element 20A. Note that, as the light fluxes in the wavelength ranges corresponding to, for example, the display elements 20A and 20B, any two of the light fluxes among the three primary colors of blue, green, and red can be assigned arbitrarily to the display elements, with either one of the two primary colors corresponding to either one of the two display elements. As in Embodiment 1 of FIG. 1 and as shown in FIG. 5, in Embodiment 3 the positions where the optical axes of the illumination optical systems which illuminate the display elements 20A and 20B and the optical axes of the projection optical system (to which light beams from the display elements 20A and 20B intersect the display elements 20A and 20B) are displaced from the central positions of the liquid crystal light valves 20A and 20B (and it these positions through which the broken lines $X_{20A}$ and $X_{20B}$ that are parallel to the optical axes in FIG. 5, pass).

In Embodiment 3, as in Embodiments 1 and 2, the image display region of each of the display elements 20A and 20B is made smaller than the effective pixel region, and the central position of the image display region of each of the display elements 20A and 20B is offset from the central position of the effective pixel region by satisfying the display element installment condition of the present invention. Namely, for a display element having an aspect ratio of 4:3 of its effective pixel region, as is conventional, the image display region has a square shape. Additionally, in the display element 20A, the image display region is displaced toward the right as shown FIG. 5 within the effective pixel region. As viewed from the polarization-sensitive beam splitter/combiner 26, the displacement appears as shown with respect to liquid crystal light valve 10A in FIG. 2. Similarly, in the display element 20B, as seen from polarization sensitive beam splitter/combiner 26, the image display region is displaced toward the left as shown with respect to display element 10B in FIG. 2. Therefore, in Embodiment 3, as in Embodiment 2, the size of the optical block which comprises the polarization sensitive beam splitter/combiner 26 can be reduced, and the overall size of the projection display device can be reduced based on reducing the size of the optical block.

Figure 6:
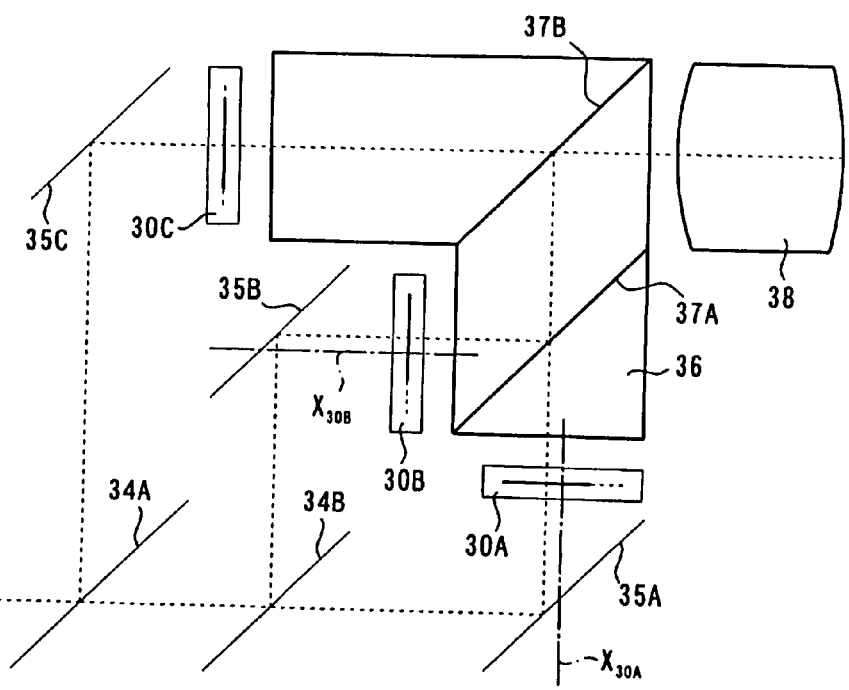
FIG. 6 is a partial cross-sectional schematic diagram of a projection display device of Embodiment 4 of the present invention.
Figure 7:
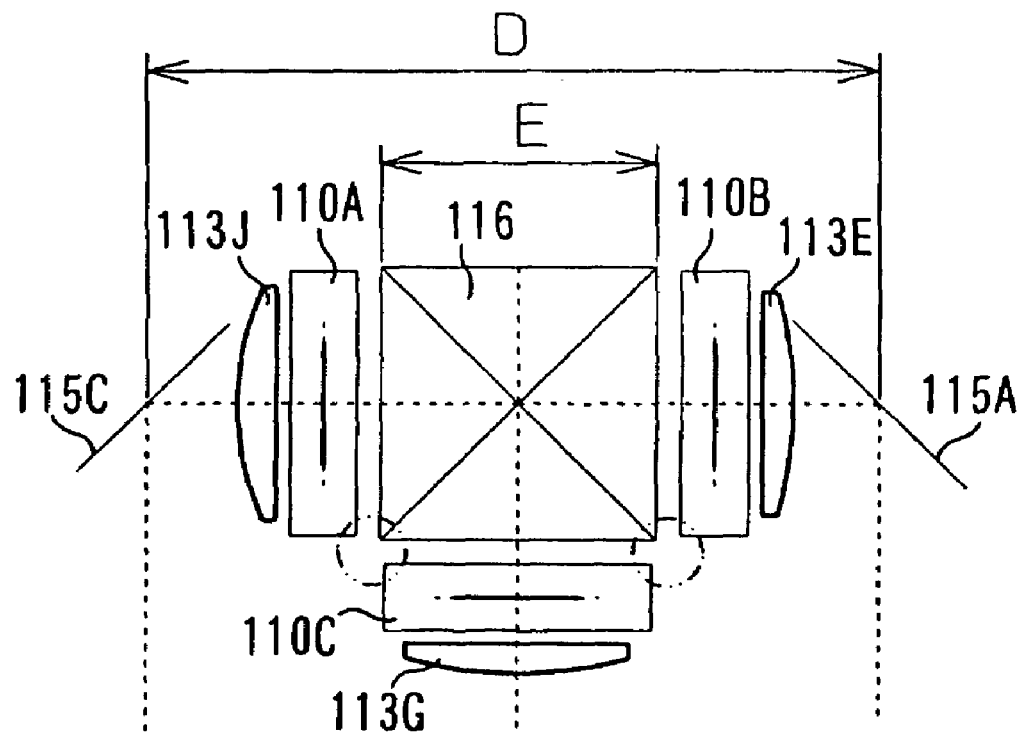
FIG. 7 is a partial cross-sectional schematic diagram of a prior art projection display device.

FIG. 6 is a partial cross-sectional schematic diagram of a projection display device of Embodiment 4 of the present invention. In Embodiment 4, transparent-type liquid crystal light valves 30A–30C are used as display elements. Embodiment 4 operates in a similar manner to the previously described embodiments by dividing a light flux from a light source according to color into separate light beams, irradiating a display element with a light beam of a particular color so that each display element modulates one of the colored light beams, combining the light beams, and providing a magnified projected image of the image information in the three colored light beams. Therefore, the operation of Embodiment 6 will only be briefly described.

As shown in FIG. 6, an illumination light flux is guided through color dividers 34A and 34B that are dichroic mirrors and total reflection mirrors 35A–35C of the illumination optical system to display elements 30A–30C. As shown in FIG. 6, the color divider 34A divides light that is directed toward the display element 30C from other light, and the color divider 34B divides this other light into a light beam that is directed toward the display element 30B and a light beam that is directed toward the display element 30A.

Also, a projection optical system that projects a magnified image with image information in the light beams modulated by the display elements 30A–30C includes a color combiner 36, which is a dichroic prism formed as an optical block, and a projection lens 38. The dichroic structure of the color combiner 36 includes a dichroic film 37A that transmits light of a color corresponding to display element 30A and reflects light of a color corresponding to display element 30B and a dichroic film 37B that transmits light of a color corresponding to display element 30C and reflects light of other colors. Primary colors of blue, green, and red may be arbitrarily assigned to each of the display elements 30A–30C. As with Embodiment 1 (shown in FIG. 1), in Embodiment 4 (shown in FIG. 6) the positions where the optical axes of the illumination optical systems which illuminate the display elements 30A and 30B and the optical axes of the projection optical system (to which light beams from the display elements 30A and 30B intersect the display elements 30A and 30B) are displaced from the central positions of the liquid crystal light valves 30A and 30B (through which broken lines $X_{30A}$ and $X_{30B}$ in FIG. 6 that are parallel to the optical axes pass).

In Embodiment 4, as in Embodiments 1–3, the image display region of each of the display elements 30A and 30B is smaller than the effective pixel region, and the central position of the image display region of each of the display elements 30A and 30B is offset from the central position of the effective pixel region by satisfying the display element installment condition of the present invention. Namely, for a display element having an aspect ratio of 4:3 of its effective pixel region, as is conventional, the image display region has a square shape. Additionally, in the display elements 30A and 30B, the image display regions are displaced toward the left in the effective pixel region as viewed from the illumination optical system side, as similarly shown with regard to display element 10B in FIG. 2. Therefore, in Embodiment 4, as in Embodiments 1–3, the size of the optical block that comprises the polarization sensitive beam splitter/combiner 26 can be reduced, and the overall size of the projection display device can be reduced based on reducing the size of the optical block.

This embodiment may not only achieve size reduction based on reduction in the size of the optical block that serves as a beam combiner and by maintaining a specified separation in the nearest-neighbor distance between the display elements, but it can also achieve size reduction based on reduction of the optical block size and by maintaining a specified separation between each display element and the optical block that serves as a beam combiner. As shown in FIG. 6, by setting the transparent-type liquid crystal display element 30B so that the central position of the image display region and the central position of the effective pixel region deviate from each other in a specified direction, while retaining a specified space from the color combiner on the upper side of this display element 30B, the width of the prism face that opposes the image display region of this display element 30B can be reduced. This enables reducing the size of the color combiner optical block both in the vertical and horizontal directions as shown in FIG. 6. As a result, the device can be made even more compact.

Note that in this embodiment the display element 30C has the central position of its image display region coincident with the central position of the effective pixel region in the same manner as shown in FIG. 2 with regard to display element 10C as viewed from the illumination optical system side. Thus, the positions of the image display regions of display elements 30A and 30B are set differently from the position of the image display region of display element 30C.

Additionally, the projection display device is constructed so that the position where the optical axes of the illumination optical systems that illuminate the display elements 30A and 30B and the position where the optical axes of the projection optical systems for display elements 30A and 30B intersect the display elements 30A and 30B are different from the position where the optical axis of the illumination optical systems that illuminates the display element 30C and the position where the optical axis of the projection optical system for display element 30C intersects the display element 30C. In particular, as shown in FIG. 6, only for display element 30C do the optical axes of the illumination optical system and of the projection optical system pass through the central position of the effective pixel region of the display element.

According to the projection display device of the present invention, because the image display regions of at least one display element is made to be smaller than the effective pixel region that surrounds it and the central position of the image display region is offset from the central position of the effective pixel region, the size of the optical block color combiner that combines light beams containing image information can be made smaller. Also the entire projection display device can be made smaller accordingly, which assists in achieving a projection display device that can use low-cost, conventional display elements and produce a projected image with a different aspect ratio and/or a different number of image pixels from that of the effective pixel regions of one or more of the display elements.

The projection display device of the present invention is not limited to the embodiments described above but may be varied in numerous ways. For example, the optical block color combiner of the projection display device is not limited to prism structures as shown in the embodiments described above. Rather it may, for example, include a combination of a plate-shaped dichroic mirror and a polarizer. Alternatively, it may be a single plate-shaped element. The desired functions can also be achieved by placing plate-shaped members at positions corresponding to a dichroic film and a polarization sensitive beam splitting film that perform color separation and/or color combining and that are inside a prism. References to an optical block color combiner in the description of the above embodiments relate generally to regions in optical structures where such plate-shaped elements may be placed.

Additionally, the display elements of the projection display devices of the present invention are not limited to reflection-type liquid crystal display elements and transparent-type liquid crystal display elements, but may also include projection display devices that use micro-reflective structures, for example, digital micro mirror devices, such as those manufactured by Texas Instruments Corporation.

Also, the display elements are not limited to those having an aspect ratio of 4:3 of the effective display region. Also, the image display region is not limited to a square shape and may, in fact, be given any aspect ratio.

Furthermore, in the construction of the projection display devices of the present invention, the construction of the illumination optical system and the optical block beam combiner that combines beams of different colors of the projection optical system can be changed as necessary based on the properties of the display elements. For example, in a projection display device that uses two to four polarizing beam splitters to divide the illumination light flux into three primary colors and irradiate them onto three reflective-type display elements according to the present invention, the size of an optical block beam combiner that includes the polarizing beam splitters opposing the two reflective-type image display elements can be reduced, and along with this size reduction the projection display device as a whole can be reduced accordingly.

Additionally, in the projection display device of the present invention, the multiple display elements are not limited to display elements corresponding to light beams of different colors from one another. For example, the present invention can be applied to a device provided with multiple display elements that project light that forms a monochromatic image or a device that includes at least two display elements using light of the same color. The optical block beam combiner is not limited to one that performs color composition but rather relates generally to an optical block beam combiner that combines light beams incident from different directions and emits them in a common specified direction.

The present invention is not limited to the aforementioned embodiments, nor to the variations described above, as it will be obvious that various alternative implementations are possible. All such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection display device comprising:
    a plurality of display elements, each display element including an effective pixel region and an image display region that is smaller than its effective pixel region and is within its effective pixel region;
    an illumination optical system that includes a plurality of light beams, a different one of said plurality of light beams being incident on a different one of said plurality of display elements; and
    a projection optical system including an optical-block-type combiner that combines the plurality of light beams after they are incident on a different one of said plurality of display elements;
    wherein
    each image display region of each display element modulates with two-dimensional image information the different one of said plurality of light beams that is incident on the display element; and
    the central position of the image display region of at least one of said plurality of display elements is offset from the central position of that display element's effective pixel region so that the distance between the central positions of the image display regions of at least two of the display elements, including at least one of said plurality of display elements that has the central position of its image display region offset from the central position of the effective pixel region, is less than the distance between the central positions of adjacent image display elements.

2. The projection display device of claim 1 wherein, for each of said plurality of display elements, the aspect ratio of the effective pixel region and the aspect ratio of the image display region are different.

3. The projection display device of claim 1, wherein the central position of the effective pixel region and the central position of the image display region of at least one of said plurality of display elements coincide with one another.

4. The projection display device of claim 2, wherein the central position of the effective pixel region and the central position of the image display region of at least one of said plurality of display elements coincide with one another.

5. The projection display device of claim 1, wherein:
the illumination optical system includes an optical axis for each of said plurality of light beams;
the projection optical system includes an optical axis for each of said plurality of light beams; and
at least one of the optical axes of the illumination optical system and of the projection optical system does not pass through the central position of the effective pixel region of a display element.

6. The projection display device of claim 2, wherein:
the illumination optical system includes an optical axis for each of said plurality of light beams;
the projection optical system includes an optical axis for each of said plurality of light beams; and
at least one of the optical axes of the illumination optical system and of the projection optical system does not pass through the central position of the effective pixel region of a display element.

7. The projection display device of claim 1, wherein the optical block combiner is a dichroic prism.

8. The projection display device of claim 2, wherein the optical block combiner is a dichroic prism.

9. The projection display device of claim 3, wherein the optical block combiner is a dichroic prism.

10. The projection display device of claim 4, wherein the optical block combiner is a dichroic prism.

11. The projection display device of claim 5, wherein the optical block combiner is a dichroic prism.

12. The projection display device of claim 6, wherein the optical block combiner is a dichroic prism.

13. The projection display device of claim 7, wherein the dichroic prism is an X-shaped dichroic prism.

14. The projection display device of claim 8, wherein the dichroic prism is an X-shaped dichroic prism.

15. The projection display device of claim 9, wherein the dichroic prism is an X-shaped dichroic prism.

16. The projection display device of claim 10, wherein the dichroic prism includes an X-shaped dichroic structure.

17. The projection display device of claim 11, wherein the dichroic prism includes an X-shaped dichroic structure.

18. The projection display device of claim 12, wherein the dichroic prism includes an X-shaped dichroic structure.

19. The projection display device of claim 1, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

20. The projection display device of claim 2, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

21. The projection display device of claim 3, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

22. The projection display device of claim 4, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

23. The projection display device of claim 5, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

24. The projection display device of claim 6, wherein the optical block combiner includes at least one polarization sensitive beam splitter that reflects at least one of said plurality of light beams modulated with two-dimensional image information and transmits at least one of said plurality of light beams modulated with two-dimensional image information based on different directions of linear polarization of the light beams in order to combine the two light beams so that they are projected in the same direction for forming a magnified projected image including the two-dimensional image information of the two light beams.

* * * * *